United States Patent [19]

Graebe

[11] 3,747,952

[45] July 24, 1973

[54] PROTECTIVE DEVICE

[76] Inventor: Robert H. Graebe, 4 Signal Hill Blvd., East St. Louis, Ill. 62203

[22] Filed: Sept. 17, 1971

[21] Appl. No.: 181,438

[52] U.S. Cl. ............... 280/150 AB, 9/316, 137/67, 222/5, 5/348
[51] Int. Cl. ........................................... B60n 21/08
[58] Field of Search ................. 280/150 AB; 222/5; 9/316–324; 5/348; 244/121

[56] References Cited
UNITED STATES PATENTS

| | | | |
|---|---|---|---|
| 978,378 | 12/1910 | Ingaramo | 9/317 |
| 2,418,798 | 4/1947 | Whitmer | 244/121 |
| 2,780,389 | 2/1957 | Sandgren | 222/5 |
| 3,579,964 | 4/1971 | Ohlstein | 222/5 |
| 3,582,107 | 6/1971 | Goetz | 280/150 AB |
| 3,603,535 | 9/1971 | De Polo | 280/150 AB |
| 3,622,176 | 11/1971 | Byer | 180/90 X |
| 3,632,133 | 1/1972 | Hass | 280/150 AB |
| 3,642,303 | 2/1972 | Irish et al. | 280/150 AB |

FOREIGN PATENTS OR APPLICATIONS

| | | | |
|---|---|---|---|
| 1,431,098 | 1/1966 | France | 280/150 AB |

Primary Examiner—Kenneth H. Betts
Assistant Examiner—John P. Silverstrim
Attorney—Gravely, Lieder & Woodruff

[57] ABSTRACT

A protective device for occupants of vehicles includes a manifold disposed in front of passengers and connected with a source of high pressure gas. The manifold has closely spaced ports facing the passengers and may be covered with a padding material having outwardly opening pockets at the ports. The pockets contain flexible tube elements which are connected to the ports and are normally deflated and compacted into the pockets. When the vehicle experiences a collision, the high pressure gas is generated or released and inflates the tube elements, causing them to expand from the pockets and form a protective cushion in front of the passengers. This cushion has little or no fabric or surface tension forces and when used with proper valves or tube element shapes can provide controlled retarding force.

15 Claims, 5 Drawing Figures

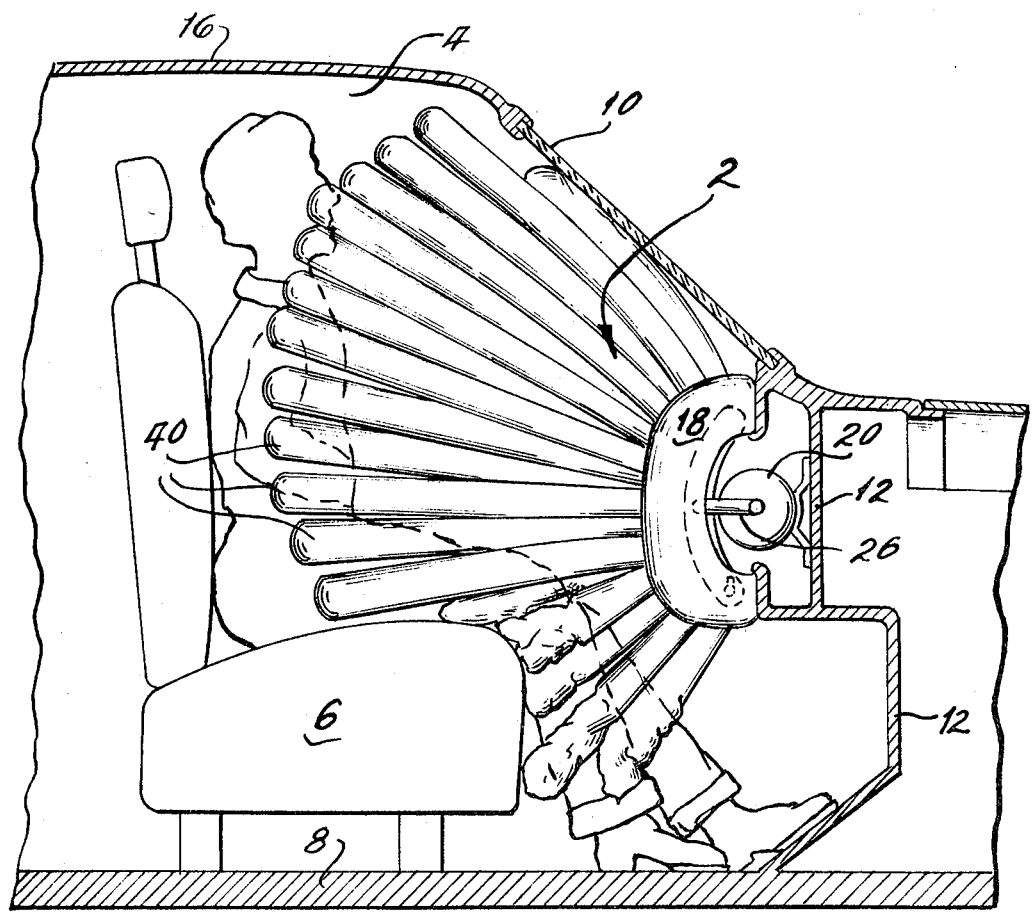
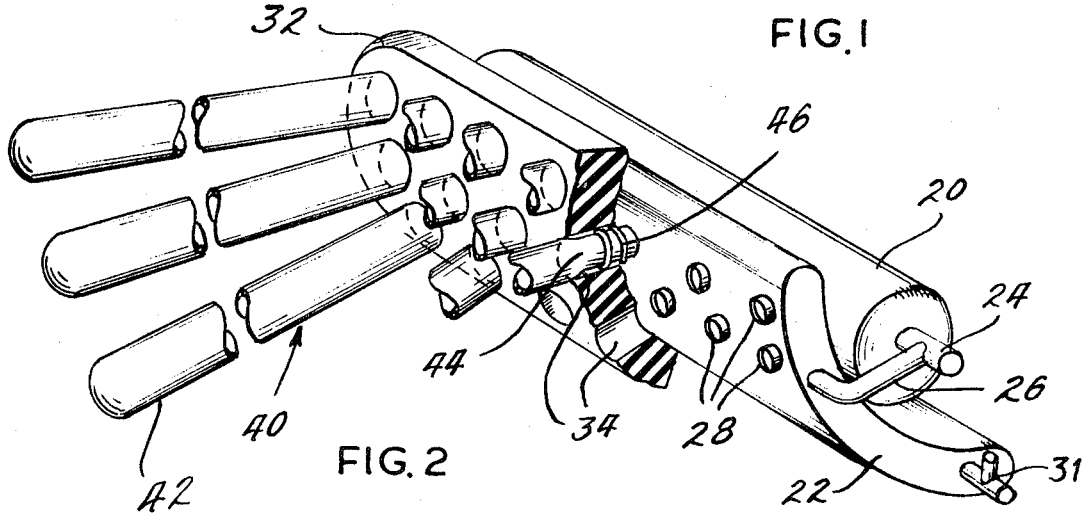

INVENTOR:
ROBERT H. GRAEBE
BY Gravely, Lieder & Woodruff
ATTORNEYS.

PROTECTIVE DEVICE

REFERENCE TO PRIOR APPLICATION

This invention is related to the invention disclosed in the copending application of Robert H. Graebe, Serial No. 781,472 filed December 5, 1968 now U.S. Pat. No. 3,605,145.

BACKGROUND OF THE INVENTION

This invention relates in general to protective devices, and more particularly to a protective device for containing and cushioning individuals from severe impacts.

It has been suggested that automotive vehicles be provided with inflatable bags which are normally stored in a deflated condition within the passenger compartment, and are rapidly inflated from a gas generator when the vehicle is subjected to a severe impact. The inflatable bags heretofore envisioned can be quite large, and must be deployed from one central exit point. The speed of deployment is therefore limited by the amount of unfolding which must occur. During this unfolding operation very little impact protection is available to the occupant. In other words, the bags must be nearly fully inflated to provide adequate protection, but often sufficient time is not available to effect a complete inflation. Also, while a single bag may provide some measure of protection against purely head-on impacts, it will not adequately confine the individuals behind it against lateral movement or otherwise prevent them from being thrown about the passenger compartment should the vehicle turn over or be subjected to lateral impacts. In this same vein, such bags do not provide sufficient protection and can Injure the so-called out-of-position occupants, that is those passengers who are not occupying normal seat positions at the time of the collision. Moreover, the deployment of large bags is usually accompanied by noise of extremely large magnitude, and this noise could prove damaging to the ears.

SUMMARY OF THE INVENTION

One of the principal objects of the present invention is to provide a protective device which is stored in an extremely compact condition, but which will rapidly inflate uniformly, upon receiving a proper signal from a crash sensor when the vehicle is subjected to a severe impact, to cushion the occupant from the interior structures of the vehicle. Another object is to provide a protective device of the type stated which substantially envelops the occupants of the vehicle so that they are completely contained and will not shift about the interior of the passenger compartment during a crash. A further object is to provide a protective device of the type stated which provides protection against lateral impacts and protection for out-of-position occupants. An additional object is to provide a protective device of the type stated which deploys at a relatively low sound level, and provides a high degree of protection as it deploys. Still another object is to provide a protective device of the type stated having a secondary energy absorption medium as back-up cushioning. Yet another object is to provide a protective device which does not significantly detract from the space available within the passenger compartment or from the appearance of the passenger compartment when not in use. An additional object is to provide a protective device of the type stated which provides rebound control, continues to maintain protection for multiple impacts, and does not hinder the breathing of one confined by it. An additionl object is to minimize injury to the occupant from the restraint device itself. Another object is to provide a means of attaining a high degree of reliability that a proper inflation will occur. These and other objects and advantages will become apparent hereinfater.

The present invention is embodied in a protective device including flexible tube-like elements which are normally housed in pockets and when inflated project beyond the pockets to form a protective cushion.

The invention also consists in the parts and in the combinations of parts hereinafter described and claimed.

DESCRIPTION OF THE DRAWINGS

In the accompanying drawings which form part of the specification and wherein like numerals refer to like parts wherever they occur.

FIG. 1 is a fragmentary sectional view of an automobile provided with a protective device constructed in accordance with and embodying the present invention;

FIG. 2 is a perspective view, partially broken away and in section, of the protective device;

DETAILED DESCRIPTION

Figure 3:
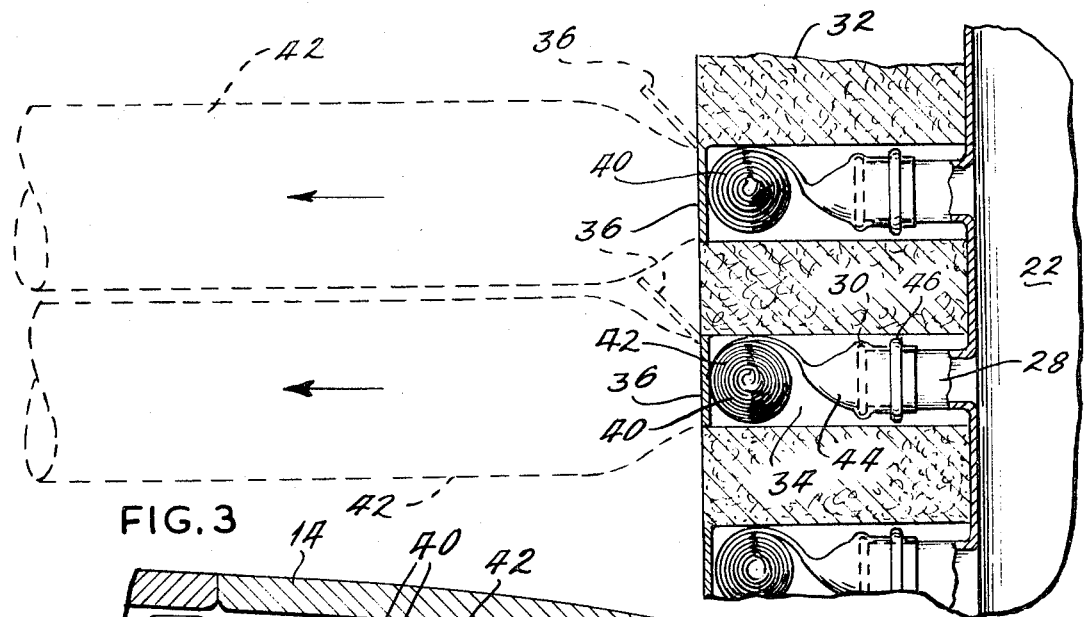
FIG. 3 is a fragmentary sectional view taken through some of the pockets of the protective device.

Referring now to the drawings, 2 (FIG. 1) designates a protective device for protecting the occupants of the passenger compartment 4 of an automobile or other vehicle. The passenger compartment 4 contains a seat 6 which is anchored to a floor 8 and faces toward a windshield 10 and a firewall 12 both of which define the front of the passenger compartment 4. The sides of the passenger compartment 4 are closed by doors 14, while the top is closed by a roof 16. Positioned in front of the firewall 12 is a dashboard 18, and the dashboard 18 supports and contains the protective device 2, which when deployed substantially fills the front part of the passenger compartment 4 with long and slender inflated elements capable of cushioning impacts resulting from collisions or from the vehicle overturning.

The protective device 2 includes a compressed gas cylinder 20 which is mounted in a fixed position behind the dashboard 18. Disposed in front of the cylinder 20 is a manifold 22 which is configured to generally wrap around the forwardly presented side of the cylinder 20 so that the manifold 22 possesses a generally arcuate shape. At its head end the cylinder 20 is provided with an explosive, an electrically, or a mechanically operated valve 24 which is normally closed and is energized by a sensing element or crash sensor (not shown). The sensing element is conventional and is responsive to impacts. When such an impact is detected an electric current or other properly conditioned signal is directed to the valve 24 which opens and allows the stored contents of the cylinder 20 to discharge as a high pressure gas. The valve 24 and manifold 22 are connected through a tube 26 so that when the valve 24 opens, the compressed gas is released into the manifold 22. The manifold 22 has a multiplicity of tube-like exhaust ports 28 projecting from its rearwardly presented face at closely spaced intervals, and these ports 28 are slightly enlarged at their outer ends in the formation of slight flanges 30. Finally, the manifold 22 is provided with a release valve 31 which is timed to open at the end of a predetermined period after the sensing element is activated.

In lieu of the compressed gas cylinder 20, a solid state gas generator may be utilized to supply the high pressure gas. These devices, upon receiving a signal from the crash sensor, generate gas and discharge it at high pressure.

The rearwardly presented face of the manifold 22, that is, the face presented rearwardly toward the passenger compartment 4 and seat 6 therein may be covered by a housing or padding material 32 of substantial thickness, and this material is preferably a foamed or cellular plastic such as polyurethane. The padding material 32 has sufficient body to remain self-standing and only deforms when subjected to outside forces such as those occasioned by a passenger bumping into it. The padding material 32 projects outwardly considerably beyond the outer ends of the ports 28, and at each port 28 is provided with a generally cylindrical pocket 34 so that the ports 28 are disposed within the pockets 34. The pockets 34 extend completely through the padding material 32 and at their outer ends are closed by cover devices 36 which normally lie flush with the exposed surface of the padding material 32. The devices 36, however, are mounted such that they swing outwardly or otherwise leave their covering position when subjected to outwardly directed forces from within the pockets 34.

In addition to the exhaust ports 28, each pocket 34 further contains a flexible tube element 40 which is normally deflated and coiled or otherwise disposed in a highly compact configuration so that it will fit entirely within its pocket 34. Preferably, the tube elements 40 are formed from a flexible material. Each tube element 40 includes an elongated body 42 of substantially uniform or tapered diameter. At its one end the body 42 is closed, while at its opposite end it merges into a neck 44 which fits over the exhaust port 28 within the pocket 34. The neck 44 is retained on the exhaust port 28 by a cinch ring 46 which embraces the neck 44 and the port 28 between the slight flange 30 and the manifold 22. When the tube elements 40 are elongated, that is when they are inflated, they possess sufficient length to reach almost to the seat 6.

Figure 4:
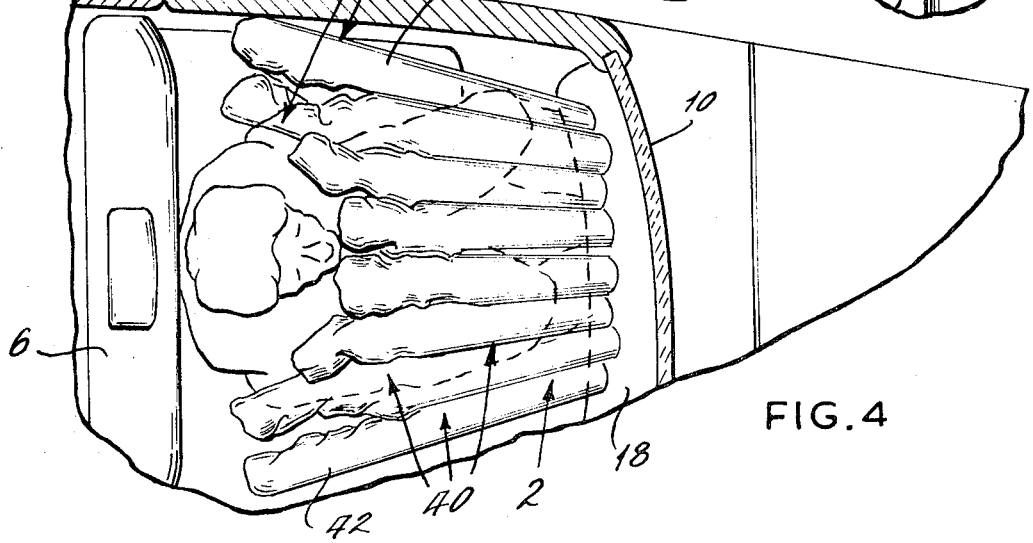
FIG. 4 is a top view showing the protective device inflated and cushioning a passenger of an automotive vehicle.

Should the vehicle having the protective device 2 therein become involved in a collision, the sensing device will be activated, and it will cause energy to become available to operate the valve 24. The valve 24, in turn, will release the contents of the cylinder 20 and allow that gas to flow through the tube 26 and into the manifold 22. If a solid state gas generator is used, the sensing device will activate the generator and cause it to generate high pressure gases which likewise will be directed through the tube 26 to the manifold 22. The pressurized gas within the manifold 22 exhausts into the coiled tube elements 40. As the tube elements 40 expand within their respective pockets 34, they bear against the cover devices 36 and dislodge them from their covering positions over the pockets 34. Thereafter, the tube elements 40 expand through the passenger compartment 4 toward the seat 6 and bear against passengers seated upon the seat 6 (FIGS. 1 and 4). In this connection, it should be noted that the incline and shape of the open ends for the various pockets 34 is such that the inflated tube elements 40 expand through substantially the entire forward portion of the passenger compartment 4. The foregoing events occur within a fraction of a second and cause a useful surface to be deployed uniformly and synchronously throughout its entire length of travel and before the forward momentum of the passengers bring them to the dashboard 18.

Since the exhaust ports 28 are closely spaced on the manifold 22, the elongated bodies 42 of the tube elements 40 substantially fill that part of the passenger compartment 4 located immediately behind the dashboard 18 and windshield 10, so that during the impact the passengers are prevented from being hurled against the windshield 10 or rigid structural portions of the vehicle. Instead the passengers sink into the multitude of inflated elements 40 located ahead of them and this of course cushions the impact significantly. In some vehicles it may be desirable to concentrate more flexible tube elements in one part of the passenger compartment 4 than other parts, and this is easily accomplished by varying the angles and shapes of the pockets 34 at their open ends. Thus, the tube elements 40 can be directed to bunch together, and likewise to extend into remote areas. Inasmuch as the tube elements 40 are structurally independent of one another the expansion of each tubular element 40 is not in any way inhibited by adjacent tube elements 40. Therefore, while one element may engage one of the passengers and be prevented from fully expanding thereby, other elements 40 will expand fully toward the seat 6, thus providing cushioning to the sides and top of the passengers so as to completely confine them in the event of a collision. This ability of the protective device 2 to completely confine and contain passengers is extremely valuable in collisions involving subsequent lateral impacts or where the vehicle rolls over. The presence of a multiplicity of tube elements 40, instead of a single large air bag, causes only the deployment energies of those tube elements 42 that engage the occupant to be absorbed by the occupant which greatly reduces the chances of injury to the occupant over those of a large bag. To retain the tube elements in a gathered or bunched arrangement so that they do not spread excessively when a passenger sinks into them, the tube elements at the periphery of the pattern may be connected together through a string or elastic band.

The multiplicity of tube elements also causes acoustic attenuation so that the sound level at deployment is not nearly as great as the air bag type of protective device. In other words, each tube element can be made to deploy at a slightly different rate causing out-of-phase sound pressure fronts which will tend to cancel themselves out and the space between each tube element helps to trap acoustic energies.

To enhance the cushioning effect orifices may be provided at each port 28 so that when a flexible element 40 is compressed due to the inertial force of a passenger against it, it will not deflate rapidly, but instead will deflate at a controlled rate. When orifices are employed, they can be used in conjunction with check valves or can be incorporated into a differential flow valve which will permit rapid inflation of flexible elements 40. In other words, the presence of orifices should not in any way impede the inflation of the flexible elements 40, for it is important to have them deploy in the shortest possible time.

If the impact is severe enough to completely collapse the tubular elements 40, the padding material 32 will provide back-up cushioning. As previously noted, the rate of energy absorption can be controlled by installing an orifice at the base of each flexible tube element 40. Likewise, it can be altered by varying the elasticity that each tube element 42 possesses. The gas entrapped in each tube element 42 that is being collapsed by the occupant, is caused to flow into the manifold and will pass into other flexible tube elements 42. When the restraining forces caused by the impact are over, the compressed gas which is now stored in the unengaged flexible tube elements will flow back, at a rate which prevents rebounding the occupant, into previously collapsed flexible tube elements that were engaged by the constrained occupant. This mode of operation makes the system available for successive impacts until such time as the timed release valve 31 located on the manifold 22 is opened to deflate the system to assist in disengaging the occupant. If no second impact protection is desired then ventilated flexible tube elements or manifold can be used which need not be intercommunicated.

Figure 5:
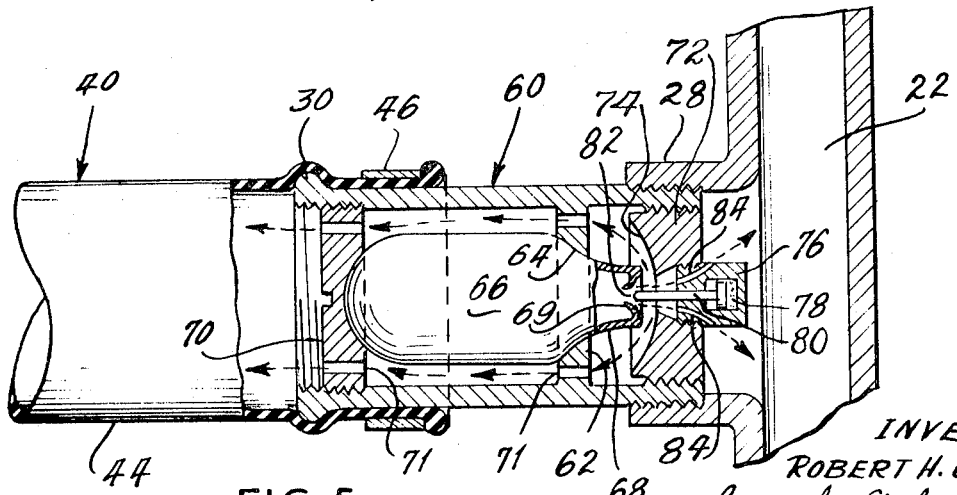
FIG. 5 is a fragmentary sectional view showing the porting in a modified form of the protective device.

In a modified embodiment of the protective device 2, (FIG. 5), the cylinder 20, valve 24, and tube 26 are eliminated and the manifold 22 is sealed, except at the exhaust ports 28, each of which or one of a cluster is threaded internally to receive and retain an adapter 60. The slight flange 30 is formed on the opposite end of the adapter 60 and the neck 44 of the tube element 40 is fitted over the adapter 60 and retained thereon by the cinch ring 46.

Internally, the adapter 60 is provided with a web 62 having a conical seat 64 thereon, and the seat 64 retains the end of a small vessel or cylinder 66 of a solid state gas generator or contains compressed gas. Actually, the cylinder 66 at its one end has a reduced end portion 68 which projects through the seat 64 and beyond the web 62 where it is provided with a puncturable seal 69, while at its opposite end it is dome-shaped. The opposite end of the adapter 60, that is the outermost end, has internal threads and receives a threaded cap 70 which screws down against the domed end of the cylinder 66 and retains it in place. Both the web 62 and the cap 70 have axially extending ports 71 which allow gas discharged from the neck of the cylinder 66 to pass along the side thereof and into the tubular element 40.

The inner end of the adapter 60 is likewise threaded and is fitted with a plug 72 having a dish-shaped deflector surface 74 presented toward the end portion 68 of the cylinder 66. The plug 72 is centrally apertured and fitted with an electrically operated detonator 76 which contains a small explosive charge 78 and a shiftable pin 80 behind the charge 78. The pin 80 projects through the central aperture in the plug 72 and has a point 82 located immediately ahead of the seal 69 at the end of the reduced end portion 68 on the cylinder 66. In addition, the detonator 76 has several oblique passageways 84 extending through it, and these passageways open into the manifold 22. The detonator 76 is connected to a sensing device (not shown) which sends electrical current through it when an impact is detected. The oblique passageways 84 may be deleted and no manifold 22 used when ventilated tube elements 40 are used to effect rebound control.

Should the vehicle provided with the modified embodiment of the protective device 2 become involved in a collision, the sensing device will divert electrical current to the detonator 76 to ignite the explosive charge 78. This explosion will drive the pin 80 rearwardly and cause its point 82 to puncture the seal 69, thereby releasing the compressed gas or activating the gas generating material contained within the cylinder 66. Much of the gas is diverted upwardly at the dish-shaped deflecting surface 74. This gas flows through the ports 71 and into the interior of the tube elements 40. As each tube element 40 inflates, it expands outwardly and leaves its pocket 34, as previously discussed. The foregoing is, of course, repeated at each pocket 34 so that a cushion of tube elements 40 is formed in the front of the passenger compartment 4. The remainder of the gas from each cylinder 66 passes through the oblique passageways 84 in the detonator 76 and thence into the interior of the manifold 22, so that the manifold is likewise pressurized, and all tube elements 40 are in communication. Thus, the various tube elements 40 will be at the same end pressure even if all the gas sources did not become active and will exert substantially equal force on the passengers upon the seat 6. This multiple gas pressure source assures a high degree of inflation reliability. Depending on the capacity of the gas source and the inflated volume of the protective device 2, a gas source 66 may not be required at each tube element 40 but may be proportionally distributed throughout a manifold assembly 22 and have its gas additively shared by all tube elements 40. Conversely, each tube element 40 may have a gas generator 66 but only selected ones may be activated on the initial impact and the remaining unactivated gas generators 66 can be activated on successive impacts.

This invention is intended to cover all changes and modifications of the example of the invention herein chosen for purposes of the disclosure which do not constitute departures from the spirit and scope of the invention.

What is claimed is:

1. A protective device comprising: a manifold having a plurality of ports facing generally in the same direction; independent flexible tube elements connected with the ports and normally disposed in a deflated and compact condition; housing means formed from a padding material which extends across and substantially covers the manifold, the housing means having pockets in which the tube elements are disposed when deflated, cover devices normally closing the ends of the pockets to protect and obscure the tube elements contained therein; a source of high pressure gas connected to the manifold; and means for initiating the flow of gas into the manifold and tube elements to inflate the tube elements so that they expand and project outwardly from the pockets to form a protective cushion, the ends of the pockets being shaped to guide the direction the tube elements will take when inflated.

2. A protective device comprising: a manifold having a plurality of ports projecting therefrom and facing generally in the same direction; independent flexible tube elements connected with the ports and normally disposed in a deflated and compact condition, the tube elements having their inner ends fitted over and embracing the ports; housing means formed from a padding material which extends across and substantially covers the manifold, the housing means having pockets into which the ports of the manifold project and in which the tube elements are disposed when deflated; cover devices normally closing the ends of the pockets to protect and obscure the tube elements contained therein; a source of high pressure gas connected to the manifold; and means for initiating the flow of gas into the manifold and tube elements to inflate the tube elements so that they expand and project outwardly from the pockets to form a protective cushion.

3. A protective device comprising: a manifold having a plurality of ports facing generally in the same direction; independent flexible tube elements connected with the ports and normally disposed in a deflated and compact condition; closed vessels adjacent said ports and having ends presented towards the manifold, the vessels containing compressed gas; pins for puncturing the ends to allow the compressed gas to flow from the vessels; explosive charges for driving the pins into the vessels; deflecting surfaces disposed between the vessel ends and the manifold for deflecting some of the gas released from the vessels into the flexible tube elements attached to the ports, the deflecting surfaces being apertured so that some of the gas flows into the manifold, whereby the tube elements will inflate and expand away from the manifold when the vessels are punctured so as to form a protective cushion.

4. A device for protecting the occupants in the passenger compartment of a vehicle during a collision, said device comprising: a manifold having a plurality of closely spaced ports facing the passenger compartment, the ports being in communication with one another through the interior of the manifold; a source of high pressure gas connected with the manifold; means for causing the source of high pressure gas to discharge the gas into the manifold so that the gas will flow through the ports; and inflatable tube elements formed from a flexible material with each tube element being substantially longer than it is wide and with the width being substantially less than the width of an occupant, each tube element further being closed at one end and having an opening at its other end, the open ends of the tube elements being connected to the manifold at the ports thereof with each port opening into a different tube element, whereby the interiors of all the tube elements are in communication through the manifold, the tube elements being stored in a deflated and compact condition remote from the occupants and being inflated to an expanded condition in which at least some of them engage the occupants when the high pressure gas is discharged into the manifold, the ports of the manifold being positioned in close proximity to one another so that the adjacent tube elements will be close to one another when inflated, the positioning being such that when the tube elements are inflated the closed ends of a plurality of tube elements will engage an occupant both crosswise and lengthwise and as the occupant sinks into those tube elements other tube elements will be presented to the sides of the occupant to provide lateral confinement.

5. A protective device according to claim 4 and further characterized by a housing in front of the manifold and having pockets aligned with the ports, each pocket containing a separate tube element which is housed entirely within the pocket when in its deflated and compact condition, each pocket being oriented to direct the tube element therein into a selected portion of the passenger compartment when the tube element is inflated.

6. A protective device according to claim 5 wherein the ends of the pockets are normally closed by cover devices to obscure and protect the tube elements contained therein.

7. A protective device according to claim 5 wherein the ports project from the manifold and into the pockets; and wherein the tube elements at their inner ends are fitted over and embrace the ports.

8. A protective device according to claim 5 wherein the housing includes a padding material presented toward the occupants and extending across and substantially covering the manifold.

9. A protective device according to claim 4 wherein the source of high pressure gas comprises a closed vessel at at least some of the ports, and means for puncturing each vessel to allow gas to flow therefrom, each vessel being in communication with the interior of the tube element attached to the port at which it is disposed and with the interior of the manifold.

10. A protective device according to claim 9 wherein the means for puncturing each vessel includes an explosive charge and a pin which is driven into the vessel by the explosive charge.

11. A protective device according to claim 4 and further characterized by means associated with the tube elements for controlling the rate at which the gas is expelled from the tube elements and discharged back into the manifold once the tube elements have been inflated.

12. A protective device according to claim 11 wherein the means for controlling the rate at which the gas is expelled from the tube elements comprises orifices at the open ends of the tube elements.

13. A protective device according to claim 12 wherein the means for controlling the rate at which the gas is expelled from the tube elements further includes check valves at the ports and oriented to permit gas to freely enter the tube elements and to restrict the discharge of gas from the tube elements.

14. A protective device according to claim 11 wherein the means for controlling the rate at which the gas is expelled from the tube elements does not substantially impede the flow of gas into the tube elements.

15. A protective device according to claim 4 wherein the tube elements are tapered.

\* \* \* \* \*